April 27, 1937. P. E. ASHTON ET AL 2,078,524
FILTER APPARATUS
Filed Nov. 30, 1934
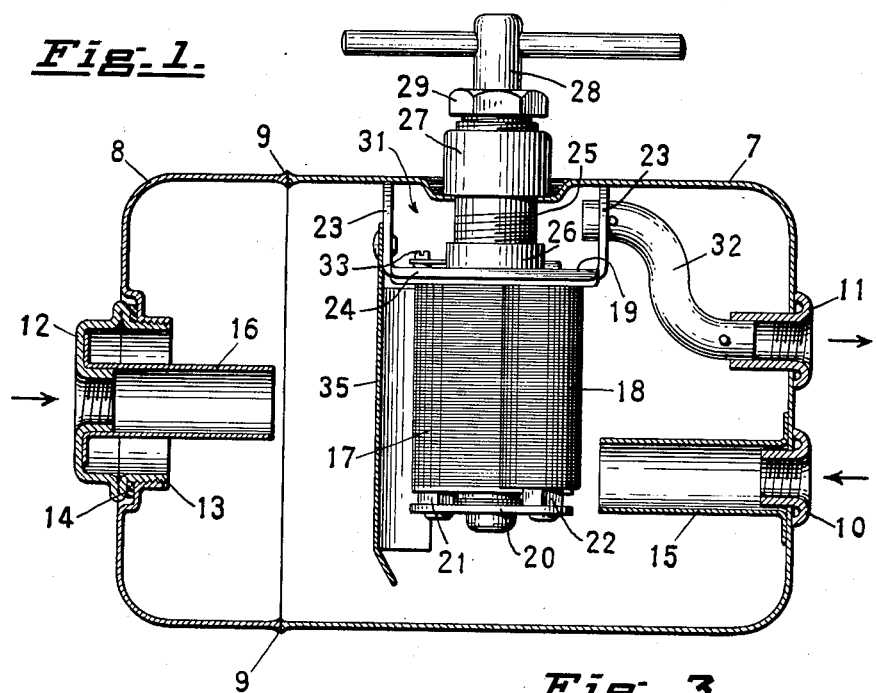
Fig. 1.
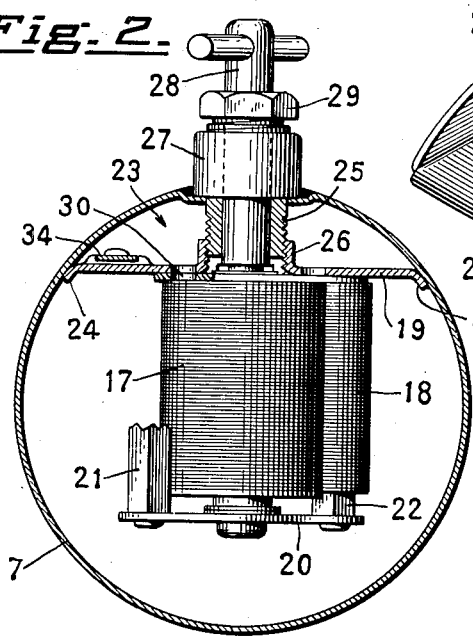
Fig. 2.
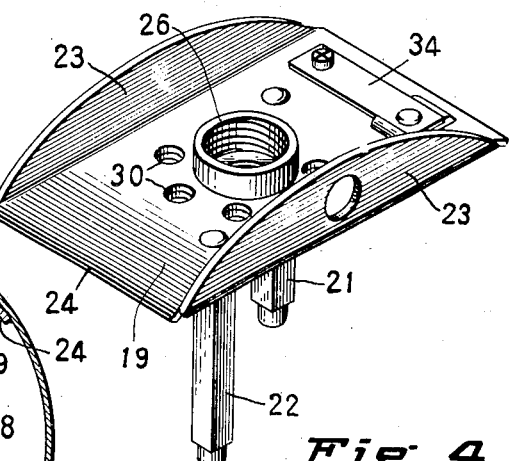
Fig. 3.
Fig. 4.
INVENTORS
P. E. ASHTON, C. B. PERKINS,
AND C. A. LIND,
BY
ATTORNEY Patented Apr. 27, 1937

2,078,524

UNITED STATES PATENT OFFICE 2,078,524

FILTER APPARATUS

Philip E. Ashton, Clarence B. Perkins, and Carlton A. Lind, Meriden, Conn., assignors to The Cuno Engineering Corporation, Meriden, Conn., a corporation of Connecticut Application November 30, 1934, Serial No. 755,272

4 Claims. (Cl. 210—167)

This invention relates to apparatus for filtering liquids in order to remove foreign particles.

The main object is to provide a filter or strainer which is effective and inexpensive and which can be used indefinitely.

It is mainly intended for filtering oil on automotive vehicles and one object is to provide a device which can be readily installed in various places and positions.

Another object is to provide a filter which is not affected by the high temperature to which it is frequently submitted.

Another object is to provide a filter which can be cleaned without taking it out of commission.

The drawing shows a number of modifications of the invention. In Figs. 1 and 2 the filtering unit is supported by a sort of bridge which in conjunction with an adjacent part or wall of the casing forms a chamber. This bridge is essentially a foundation plate carrying the filter element or unit and serving as a partition to divide the space enclosed by the filter casing into two separate chambers or compartments so that the only paths for the passage of liquid from one chamber to the other are through the filter element or through a relief valve or both.

As the direction of flow through the filter element may vary due to constructional details the chamber formed by the partition or bridge and the adjacent wall of the casing may constitute either the inlet or the outlet and the drain plug may be arranged accordingly.

Fig. 1 is a longitudinal section of a preferred construction embodying our invention.

Fig. 2 is a cross sectional view of the same.

Fig. 3 is a perspective view of the filter base used in the construction shown in Fig. 1.

Fig. 4 is a sectional view of the guard plate.

In the preferred form shown the casing is preferably made of two cup-like shell members 7 and 8 formed of steel or other suitable metal with their adjacent edges welded together along the line 9 so as to provide an indestructible casing.

Inlet and outlet nipples 10 and 11 are secured in a suitable manner as for instance by welding to a wall of the casing for instance at one end or formed in the shell and adapted to be connected to supply and discharge pipes respectively for the liquids to be filtered.

A drain outlet plug or closure 12 is preferably provided which may have a screw threaded seat 13 for connection to the casing and a gasket 14 between the closure 12 and the shell 8. This closure member may be provided with a threaded seat for the attachment of another inlet pipe if desired.

We also may provide extensions 15 and 16.

The filter proper perferably consists of a series of perforated discs 17 spaced apart from each other and scraper fingers 18 interposed in the spaces between the edges of the discs as is well known in the art. This filter unit is supported by a bridge member 19 which constitutes the top plate of the filter unit. The bottom plate 20 is united to the top plate by means of posts 21 and 22. The top plate is provided with flanges 23 which fit against the inner wall of the casing to form a discharge or outlet chamber 31. The edges of the top plate are provided with lips 24 which fit snugly against the inner wall of the casing.

A bushing 25 is threaded into the collar 26 which forms an integral part of the top plate 19. The filter unit is secured in place by screwing the bushing down tight until the shoulder 27 seats against the outer wall of the casing and the top plate or bridge 19 is drawn up tightly against the inner wall of the casing.

The central shaft 28 which carries the filter discs extends out through the packing gland 29 and is adapted to be rotated manually or otherwise for the purpose of cleaning the filter.

This cleaning action causes the foreign matter to be scraped out from between the rotating discs and to fall into the bottom of the casing. It is understood that the liquid passes from the main chamber in the casing between the discs 17 and out through the passages 30 into the chamber 31 and that the liquid is discharged through the tube 32 and the outlet nipple 11 previously mentioned.

If for any reason the filter becomes clogged so that liquid does not pass through fast enough, it is desirable to provide a bypass 33 controlled by a spring pressed valve 34. This valve opens up when the pressure in the main chamber of the filter becomes excessive and the liquid will then pass through the valve opening into the chamber 31 and thence to the outlet.

A guard plate 35 is preferably provided secured to one of the flanges 23. This guard member extends around one side of the filter plates and serves to prevent the sparks and debris of the welding operation from damaging the filter plates.

In the normal operation of the filter the filter plates are rotated from time to time for the purpose of clearing the filtering passages. The foreign matter scraped out, of course, falls down into the bottom of the casing and from time to time it may be desirable to disconnect the filter from the system, remove the drain closure 12 and flush out the casing.

It is thus possible to utilize this construction for an indefinite period. In this respect it has a great advantage over filters employing cloth or other filtering elements which have to be destroyed.

The improved type of filter can also be instantly cleaned by a simple rotation of the shaft 28 and the filter plates without the necessity of opening the filter casing.

We claim:

1. In a filter adapted for use on a vehicle, the combination with a tubular casing having walls and formed of at least two portions, a bridge plate having edge portions contacting with the casing and forming a chamber which is closed with respect to a space within the casing, a passage through the casing connected to said chamber, another passage through the casing connected to said space within the casing and outside of the chamber, a filter supported at least in part by said bridge plate and to which it is secured so that liquid entering one of said passages may pass through the filter and leave by the other passage, a bushing supported by said casing and to which said bridge plate is secured, and an actuating shaft for scraping the filter extending through said bushing and casing, said bridge plate having portions shaped to space it from the casing wall through which the actuating shaft passes.

2. In a filter adapted for use on a vehicle, the combination with a tubular casing having end walls and formed of at least two portions, a bridge plate having edge portions shaped to contact with the casing and form a chamber which is closed with respect to a space within the casing, a passage through the casing connected to said chamber, another passage through the casing connected to said space within the casing and outside of the chamber, a filter supported at least in part by said bridge plate to which it is secured so that liquid entering one of said passages may pass through the filter and leave by the other passage, a bushing supported by said casing and to which said bridge plate is secured, and an actuating shaft for scraping the filter extending through said bushing and casing, said bridge plate having portions shaped to space it from the casing wall through which the actuating shaft passes, said bushing being threaded to clamp said bridge plate against the casing with its spacing portions under compression.

3. In a filter adapted for use on a vehicle, the combination with a tubular casing having end walls and formed of at least two portions, a bridge plate having edge portions shaped to contact with the casing and form a chamber which is closed with respect to a space within the casing, a passage through the casing connected to said chamber, another passage through the casing connected to said space within the casing and outside of the chamber, a filter supported at least in part by said bridge plate to which it is secured so that liquid entering one of said passages may pass through the filter and leave by the other passage, and a drain plug in an end wall of said casing, said bridge plate being shaped to engage a curved side wall of the casing and having one pair of opposite edges extending downwardly slightly so that the surface of these end portions may be contiguous the casing longitudinally thereof, another pair of opposite edges of the bridge plate extending upwardly and curved so that they contact with the curved casing wall transversely thereof.

4. A filter comprising a casing having a main chamber with an inlet passage leading thereto, an outlet member mounted in said chamber and having flanges engaging parts of the inner wall of said chamber and having a threaded seat, a filter unit carried by said outlet member within said main chamber, an operating shaft for the filter unit extending through said member, a bushing for said shaft screwed into said threaded seat and having a shoulder outside of said casing so that when said bushing is turned in one direction the flanges of the outlet member are drawn into tight engagement with the inside of the casing and an outlet tube secured to one wall of the casing and to a part of said outlet member.

CARLTON A. LIND.
CLARENCE B. PERKINS.
PHILIP E. ASHTON.